US012652155B2

(12) United States Patent
Kim et al.

(10) Patent No.: US 12,652,155 B2
(45) Date of Patent: Jun. 9, 2026

(54) DATA PROCESSING METHOD AND DEVICE BASED ON HOMOMORPHIC ENCRYPTION

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Taechan Kim, Suwon-si (KR); Hyesun Kwak, Seoul (KR); Jinyeong Seo, Seoul (KR); Yongsoo Song, Seoul (KR); Dongwon Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 32 days.

(21) Appl. No.: 18/807,395

(22) Filed: Aug. 16, 2024

(65) Prior Publication Data

US 2024/0405969 A1 Dec. 5, 2024

Related U.S. Application Data

(63) Continuation of application No. PCT/KR2023/002154, filed on Feb. 14, 2023.

(30) Foreign Application Priority Data

Feb. 16, 2022 (KR) ........................ 10-2022-0020328
Oct. 21, 2022 (KR) ........................ 10-2022-0136337

(51) Int. Cl.
*H04L 9/06* (2006.01)
*H04L 9/00* (2022.01)

(52) U.S. Cl.
CPC ............ *H04L 9/0618* (2013.01); *H04L 9/008* (2013.01)

(58) Field of Classification Search
CPC ......... H04L 9/0618; H04L 9/008; H04L 9/00; H04L 9/06; H04L 9/14; H04L 9/30; H04L 9/06; G06F 7/523
See application file for complete search history.

(56) References Cited

U.S. PATENT DOCUMENTS 10,972,252 B2 4/2021 Gentry et al.
2013/0072223 A1* 3/2013 Berenberg .......... G06F 16/2246
707/736

(Continued)

FOREIGN PATENT DOCUMENTS

EP 3 893 429 A1 10/2021
KR 10-2339833 B1 12/2021

OTHER PUBLICATIONS

Hao Chen et al., "Efficient Multi-Key Homomorphic Encryption with Packed Ciphertexts with Application to Oblivious Neural Network Inference", CCS '19: Proceedings of the 2019 ACM SIGSAC Conference on Computer and Communications Security, Nov. 6, 2019, 31 pages, doi: 10.1145/3319535.3363207.

(Continued)

*Primary Examiner* — Quazi Farooqui
(74) *Attorney, Agent, or Firm* — Sughrue Mion, PLLC

(57) ABSTRACT

An electronic device for generating a homomorphic ciphertext, includes: at least one processor, memory storing instructions that, when executed by the at least one processor, cause the electronic device to: identify one or more messages; encode each of the one or more messages to generate a first set and a second set each including one or more ciphertexts; output a third set corresponding to a multi-key by applying a public key based on the first set and the second set; and control generation of the first set and the second set and the output of the third set to operate with a complexity of O(n), wherein n is equal to a number of the (Continued)

one or more messages and a number of the one or more ciphertexts.

15 Claims, 4 Drawing Sheets

(56)     References Cited

U.S. PATENT DOCUMENTS

| | | | |
|---|---|---|---|
| 2017/0366338 A1 | 12/2017 | Gajek | |
| 2019/0394019 A1 | 12/2019 | Gao | |
| 2020/0344049 A1* | 10/2020 | Yasuda | H04L 9/008 |
| 2020/0366459 A1 | 11/2020 | Nandakumar et al. | |
| 2021/0067315 A1 | 3/2021 | Mitchell et al. | |
| 2022/0045865 A1 | 2/2022 | Mukherjee et al. | |

OTHER PUBLICATIONS

Hyesun Kwak et al., "A Unified Framework of Homomorphic Encryption for Multiple Parties with Non-Interactive Setup", Cryptology ePrint Archive, Paper 2021/1412, Version 20211024:073020, Oct. 24, 2021, 29 pages, url: https://eprint.iacr.org/archive/2021/1412/20211024:073020.
International Search Report (PCT/ISA/210) issued on May 9, 2023 by the International Searching Authority in International Patent Application No. PCT/KR2023/002154.
Written Opinion (PCT/ISA/237) issued on May 9, 2023 by the International Searching Authority in International Patent Application No. PCT/KR2023/002154.

* cited by examiner

START

RECEIVE n MESSAGES ~301

ENCODE EACH OF n MESSAGES TO GENERATE FIRST SET AND SECOND SET EACH INCLUDING n CIPHERTEXTS ~302

OUTPUT THIRD SET CORRESPONDING TO MULTI-KEY BY APPLYING PUBLIC KEY BASED ON FIRST SET AND SECOND SET ~303

END

DATA PROCESSING METHOD AND DEVICE BASED ON HOMOMORPHIC ENCRYPTION

CROSS-REFERENCE TO RELATED APPLICATIONS

This application is a by-pass continuation application of International Application No. PCT/KR2023/002154, filed on Feb. 14, 2023, which is based on and claims priority to Korean Patent Application No. 10-2022-0020328, filed on Feb. 16, 2022 in the Korean Intellectual Property Office, and Korean Patent Application No. 10-2022-0136337, filed on Oct. 21, 2022 in the Korean Intellectual Property Office, the disclosures of which are incorporated by reference herein in their entireties.

BACKGROUND

1. Field

The disclosure relates to an apparatus and a method for processing information based on homomorphic encryption.

2. Description of Related Art

As advances in communication technology and information processing technology have increased the capabilities of attackers, the demand for a secure encryption system is increasing accordingly. An encryption algorithm has been developed under an assumption that a terminal on which the encryption algorithm operates and a user who uses the terminal are trustworthy, and even if the encryption algorithm is disclosed, an attacker who has obtained a ciphertext is unable to decrypt the ciphertext unless the encryption key is exposed. However, in a real environment, a user participating in communication may become an attacker and leak an encryption key to a third party. In addition, malware installed on a terminal of a user may act as an attacker and extract not only an encryption key itself directly but also extract the encryption key by using a ciphertext, a decrypted plaintext, or an intermediate calculation process of the ciphertext remaining in memory.

SUMMARY

According to an aspect of the disclosure, an electronic device for generating a homomorphic ciphertext, includes: at least one processor including processing circuitry, and memory comprising one or more storage media storing instructions that, when executed by the at least one processor individually or collectively, cause the electronic device: identify one or more messages; encode each of the one or more messages to generate a first set and a second set each including one or more ciphertexts; and output a third set corresponding to a multi-key by applying a public key based on the first set and the second set, wherein generation of the first set and the second set and the output of the third set are controlled to operate with a complexity of $O(n)$, and wherein n is equal to a number of the one or more messages or a number of the one or more ciphertexts.

The first set and the second set may each be decryptable with one or more secret keys, respectively, the public key may be configured by one or more public keys, and a number of the one or more secret keys and a number of the one or more public keys may be equal to the number of the one or more messages.

The third set may be an output value for a first computation configured by a product of a first ciphertext of the first set and a second ciphertext of the second set.

A first computation of a first ciphertext of the first set and a second computation of a second ciphertext of the second set may follow homomorphic attributes of gadget decomposition.

The first set and the second set may be input ciphertexts of a multi-key BFV scheme of CDKS.

The first set and the second set may be input ciphertexts of a multi-key CKKS scheme of the CDKS.

The third set may be calculated by a tensor product and re-linearization of the first set and the second set.

According to an aspect of the disclosure, a method for generating a homomorphic ciphertext by an electronic device, includes: identifying one or more messages; encoding each of the one or more messages to generate a first set and a second set each including one or more ciphertexts; and outputting a third set corresponding to a multi-key by applying a public key based on the first set and the second set, wherein generation of the first set and the second set and the outputting the third set operate in a complexity of $O(n)$, and wherein n is equal to a number of the one or more messages and a number of the one or more ciphertexts.

The first set and the second set may each be decryptable with one or more secret keys, respectively, the public key may be configured by one or more public keys, and a number of the one or more secret keys and a number of the one or more public keys may be equal to the number of the one or more messages.

The third set may be an output value of a first computation configured by a product of a first ciphertext of the first set and a second ciphertext of the second set.

A first computation of a first ciphertext of the first set and a second computation of a second ciphertext of the second set may follow homomorphic attributes of gadget decomposition.

The first set and the second set may be input ciphertexts of a multi-key BFV scheme of CDKS.

The first set and the second set may be input ciphertexts of a multi-key CKKS scheme of CDKS. The third set may be calculated by a tensor product and re-linearization of the first set and the second set.

According to an aspect of the disclosure, a non-transitory computer readable medium stores instructions that, when executed by at least one processor of an electronic device, cause the electronic device to: identify one or more messages; encode each of the one or more messages to generate a first set and a second set each including one or more ciphertexts; and output a third set corresponding to a multi-key by applying a public key based on the first set and the second set, wherein generation of the first set and the second set and the output of the third set are controlled to operate with a complexity of $O(n)$, and wherein n is equal to a number of the one or more messages or a number of the one or more ciphertexts.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
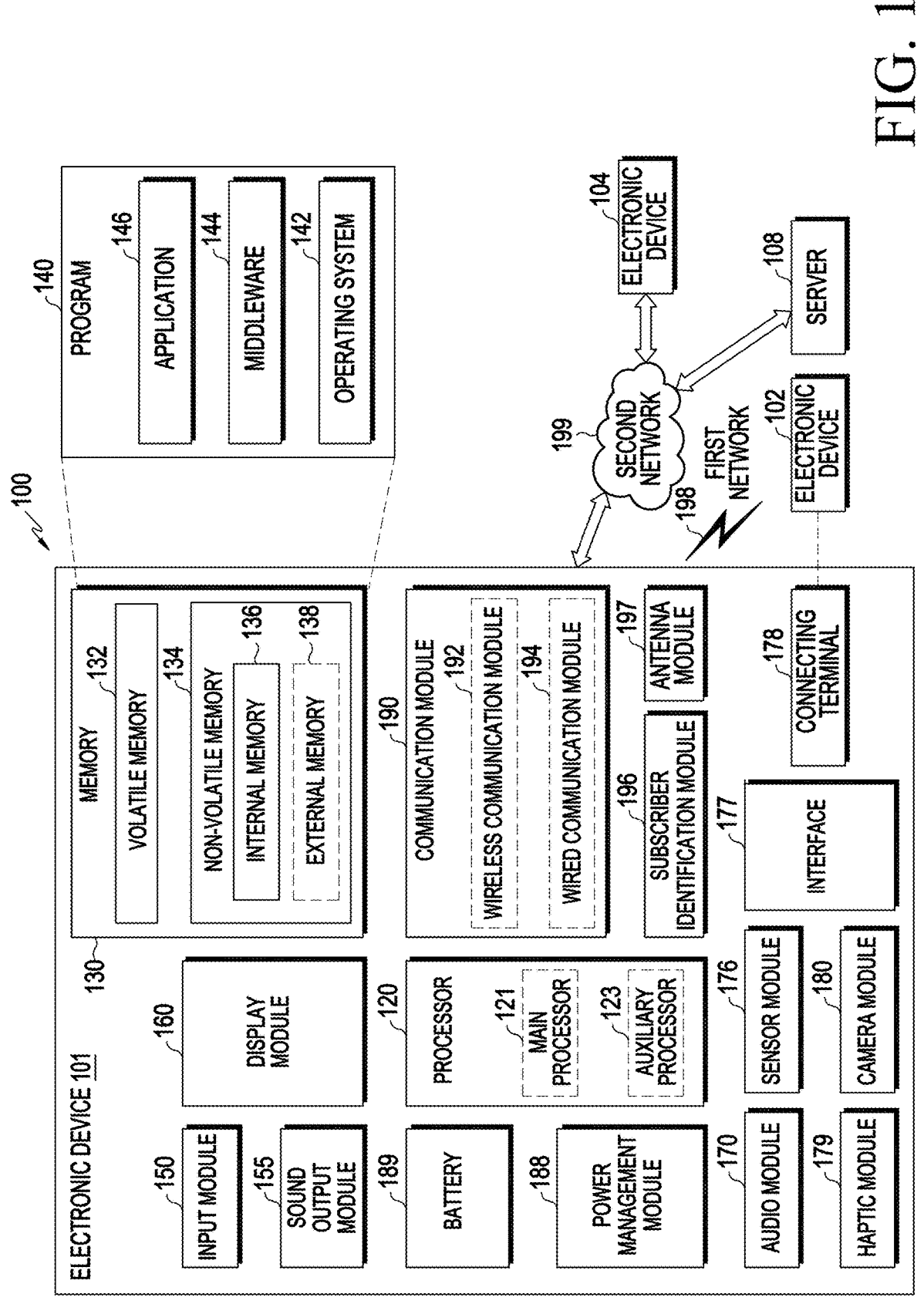
FIG. 1 is a block diagram of an electronic device in a network environment according to various embodiments.

The embodiments described, and the configurations shown in the drawings, are only examples of embodiments, and various modifications may be made without departing from the scope and spirit of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or camera module 180) may be omitted from the electronic device 101, or one or more other components may be added in the electronic device 101. In some embodiments, some of the components may be implemented in single integrated circuitry. For example, the sensor module 176 (e.g., a fingerprint sensor, an iris sensor, or an illumination sensor) may be embedded and implemented in the display device 160.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from or in conjunction with the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for receiving incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry configured to detect a touch, or sensor circuitry (e.g., a pressure sensor) configured to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
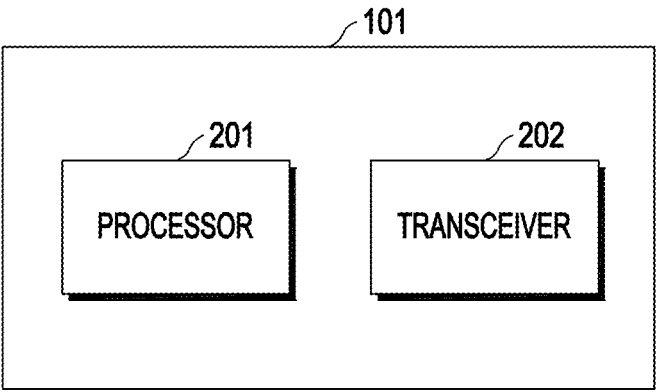
FIG. 2 is an exemplary diagram of an apparatus for processing a ciphertext according to an embodiment.

FIG. 2 relates to an apparatus for processing a ciphertext according to an embodiment.

An electronic device 101 according to an embodiment may include a transceiver 202 capable of transmitting and receiving signals, messages, and/or information, and at least one processor 201. For example, the at least one processor 201 may control an operation, etc. performed by the electronic device 101.

The electronic device 101 (e.g., the processor 120) according to an embodiment may perform a homomorphic encryption method. For example, a multi-key homomorphic encryption (MKHE) scheme may protect personal information of multiple parties, but may have poor scalability such as an increase in complexity according to the number of parties. Some embodiments may provide a homomorphic gadget decomposition method capable of improving re-linearization performance of the MKHE.

The electronic device 101 according to an embodiment may perform encryption in a manner of reducing the complexity of the re-linearization procedure from $O(n^2)$ to $O(n)$ when processing data using the homomorphic encryption method. Here, n may include the number of input ciphertexts. Big O notation, such as $O(n)$ or $O(n^2)$, may be used to indicate time complexity of a process or an algorithm relative to a size of an input of the process or the algorithm.

According to an embodiment, an encryption process of CKKS and/or BFV using multi-keys in a CDKS method may be improved. For example, according to the CDKS method, a ciphertext, $c_{i,j}$, for predetermined integers i and j, from 1 to n corresponding to an input is generated, wherein generation of the ciphertext corresponds to generating a pair for predetermined integers i and j, from 1 to n, and thus the ciphertext generation has a complexity of $n^2$. According to an embodiment, a cyphertext corresponding to an input may be input as an input ciphertext ci defined by i, which is a predetermined integer from 1 to n, and an input ciphertext cj defined by j, which is a predetermined integer from 1 to n. In an operation of generating the input ciphertext, the electronic device 101 (e.g., the processor 201) according to an embodiment executes n loops for i and n loops for j to generate a set of ciphertexts defined by the ciphertexts ci and cj, respectively, and thus may reduce the ciphertext generation has a reduced complexity of n.

Figure 3:
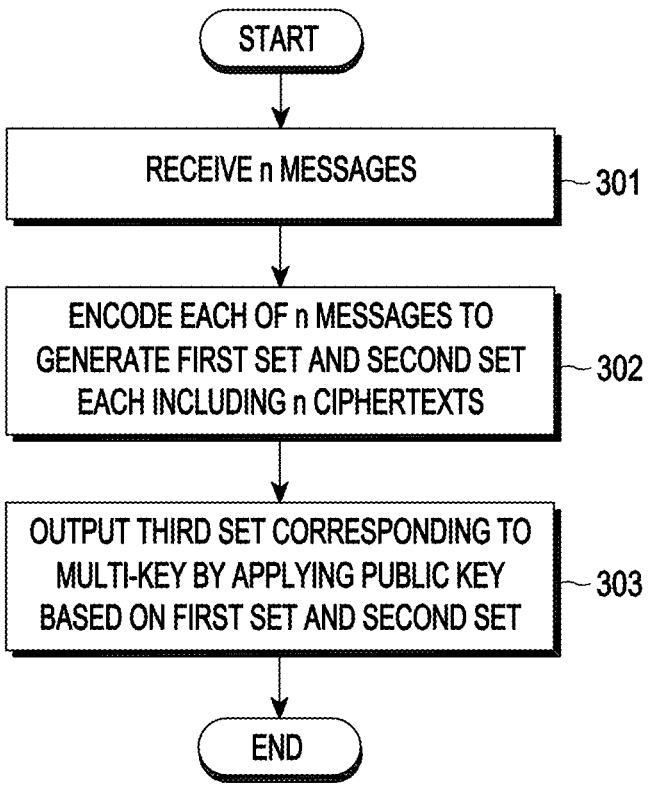
FIG. 3 is an exemplary diagram for explaining a function or operation of processing a homomorphic encryption message in an electronic device according to an embodiment.

FIG. 3 illustrates a method of processing a homomorphic encryption message in an electronic device according to an embodiment.

Referring to FIG. 3, in operation 301, the electronic device 101 according to an embodiment may identify n messages.

Chen, Dai, Kim, and Song (CDKS) of a multi-key BFV and multi-key CKKS scheme supporting homomorphic operation may be used in some embodiments. For example, in CDKS, the format of cyphertext using multi-keys may be $ci=(c0, c1, \ldots, cn)$. Here, n may denote the number of input ciphertexts, and may be a predetermined number or a number specified by a user. Here, ci may be the degree of the ciphertext. Here, the ciphertext may be decrypted by secret keys $s1, \ldots, sn$ so that $c0+c1\cdot s1+\ldots+cn\cdot sn$ are randomly encoded. Here, the homomorphic operation may be configured by two stages including a tensor product and re-linearization.

Referring to FIG. 3, in operation 302, the electronic device 101 (e.g., the processor 120 of FIG. 1) according to an embodiment may encode each of the identified n messages by using a designated encryption scheme to generate a first set and a second set each including n ciphertexts.

According to an embodiment, the electronic device 101 (e.g., the processor 120) according to an embodiment may generate a first set in which n messages are each encrypted with encoded ciphertext $(c_i)_{0 \le i \le n}$ and a second set in which n messages are each encrypted with $(c'_j)_{0 \le j \le n}$.

Referring to FIG. 3, in operation 303, the electronic device 101 (e.g., the processor 120 of FIG. 1) according to an embodiment may output a third set by applying a public key to each of the first set and the second set. The third set according to an embodiment may perform a function serving as a multi-key.

As a comparative embodiment, a multiplication $(c_{i,j}: = c_i \cdot c'_j)$, $0 \le i, j \le n$ on the ciphertext $(c_i)_{0 \le i \le n}$ (where, i is an integer from 0 to n) and $(c'_j)_{0 \le j \le n}$ may be performed by the electronic device 101 according to an embodiment. Here, $c_{i,j}$ may denote $c_i \cdot c'_j$, and i and j may be integers from 0 to n. The $c_{i,j}$ generated by the electronic device 101 according to an embodiment may be a valid ciphertext decryptable by a secret key si and a secret key sj. After the generation of the $C_{i,j}$ by the electronic device 101 (e.g., the processor 120 of FIG. 1) according to an embodiment, the electronic device 101 may perform re-linearization to convert the $C_{i,j}$ back to a linear decryption structure. The re-linearization function or operation according to an embodiment may be performed repeatedly on $c_{i,j}$. Since the $c_{i,j}$ generated by the electronic device 101 according to an embodiment may be configured by all i and j, which are configured by integers from 1 to n, the complexity of the re-linearization may increase quadratically according to n. However, an embodiment may provide an electronic device capable of reducing the quadratically increased complexity (e.g., complexity of $N^2$) in the process of generating a ciphertext to a complexity of n by executing n loops for i and n loops for j in order to generate a set of ciphertexts defined as the ciphertexts ci and cj.

As a comparative example, a gadget toolkit is a technique that may be used to reduce noise increase due to homomorphic operation. Gadget decomposition is a method capable of reducing noise in a homomorphic operation by converting ciphertext elements to short vectors in a homomorphic encryption method. For example, the homomorphic operation may be described as an h-function. As an example, a gadget toolkit for modulus Q may be configured by a fixed gadget vector g and a gadget decomposition h that converts an element "a" to a short vector h(a) such that $\langle h(a), g \rangle = a$ (mod Q). The re-linearization procedure of the CDKS may operate on a ciphertext $c_{i,j}$ together with a public key, and may include computation of the gadget decomposition $h(c_{i,j})$.

According to a comparative embodiment, since the gadget decomposition function or operation performed on $c_{i,j}$ is performed on both i and j, which include integers from 1 to n, the complexity of re-linearization of CDKS may have quadratic complexity (e.g., $O(n^2)$ complexity). However, an embodiment may provide an electronic device capable of reducing the quadratically increased complexity (e.g., $n^2$ complexity) in the process of generating the ciphertext to a complexity of n by executing n loops for i and n loops for j in order to generate a set of ciphertexts defined as the ciphertexts ci and cj.

When the electronic device 101 (e.g., the processor 120 of FIG. 1) according to an embodiment may perform a gadget decomposition operation, for example, h(a) and h(b) according to Equation 1 may be homomorphic to each other. Referring to Equation 1, h (a)+h (b) and h (a)⊙(h (b), which represent homomorphic attributes, may be regarded as valid decompositions of (a+b) and ab, respectively.

$$\langle h(a) + h(b), g \rangle = a + b \, (\mathrm{mod}Q), \qquad \text{[Equation 1]}$$
$$\langle h(a) \odot h(b), g \rangle = ab \, (\mathrm{mod}Q)$$

When homomorphic gadget decomposition is used in the MKHE method according to an embodiment, h(ci,j) may be h(ci)⊙(h(cj). The electronic device 101 (e.g., the processor 120 of FIG. 1) according to an embodiment may, instead of repeating $n^2$ gadget decompositions for all pairs (i,j), separately calculate h(ci) and h(cj) for $1 \le i, j \le n$, and compute (ci cj) by combining the separately calculated results. For example, the electronic device 101 (e.g., the processor 120 of FIG. 1) according to an embodiment may determine h(ci) and h(cj), and instead of calculating h(ci)⊙h(cj) for all i,j (for example, a total of four calculations, such as h(c0)⊙h (c0), h(c0)⊙h(c1), h(c1)⊙h(c0), and h(c1)⊙h(c1)), may calculate h(ci) and h(cj) separately and merges them (e.g., a total of two calculations, such as h(c0)⊙h(c0), h(c1)⊙h (c1))), so as to reduce the complexity of n multi-key homomorphic multiplications from $O(n^2)$ to $O(n)$ as a result.

The electronic device 101 (e.g., the processor 120 of FIG. 1) according to an embodiment may perform an encryption procedure of an MKHE method. The MKHE method according to an embodiment may include five procedures (Setup, KeyGen, Enc, Eval, and Dec). Setup according to an embodiment may include an operation pp←MKHE.Setup $(1\lambda)$ that returns a public parameter set pp when a security parameter $\lambda$ is given. KeyGen according to an embodiment may include an operation $\{ski,pki\} i \in I \leftarrow$ MKHE.KeyGen (pp, I) that outputs a secret key ski and a public key pki by using pp corresponding to an integer i included in the set I. Enc according to an embodiment may include an encryption ct←MKHE.Enc(μ;pki) operation that encrypts, for an integer i included in the set I, a plaintext μ in a message space M and outputs a ciphertext ct. In an example, Eval may be related to an operation associated with evaluation, in an operation ct←MKHE.Eval(C,$ct_1$, . . . , $ct_k$;$pk_1$, . . . , $pk_k$) that returns a ciphertext ct when a circuit C and ciphertexts ct1, . . . , ctk are provided with their respective public keys $pk_1$, . . . , $pk_k$. Here, for convenience, it may be assumed that references to the parties involved are included in the output ciphertext. For example, Dec may be associated with a decryption operation μ←MKHE.Dec(ct; $sk_1$, . . . , $sk_k$) that outputs a plaintext u when a ciphertext ct and corresponding secret keys $sk_1$, . . . , $sk_k$ are provided.

According to an embodiment, a MKHE method using homomorphic gadget decomposition may be implemented for the multi-key CKKS scheme and the multi-key BFV scheme. For example, a new ciphertext may look like a standard (single-key) RLWE encryption, but the length of the ciphertext may increase when working with multiple ciphertexts using different keys. For example, ct=(c0, c1), ct'=(c0',c1') may be the respective ciphertexts that can be decrypted for (s, s') configured by secret keys s and s'. Further, the electronic device 101 (e.g., the processor 120 of FIG. 1) according to an embodiment may decrypt the multi-key ciphertext represented by $$ct = (c_0, c_1, \ldots, c_n) \in R_Q^{n+1}$$

with the secret key SK=(S1, S2, . . . , Sn).

Referring to Table 1, the electronic device 101 (e.g., the processor 120 of FIG. 1) according to an embodiment may satisfy $(c_{i,j})_{0 \le i,j \le n}$ where $c_{i,j} = c_i \cdot c'_j$ (mod $Q_l$) for $0 \le i$, $j \le n$ as a ciphertext for a multi-key $\overline{ct}_{mul}$, when provided with two input ciphertexts $\overline{ct} = (c_i)_{0 \le i \le n}$ (where, $$\overline{ct} = (c_0, c_1, \ldots, c_n) \in R_{Q_l}^{n+1})$$

and $\overline{ct}' = (c'_i)_{0 \le i \le n}$ (where, $$\overline{ct}' = (c'_0, c'_1, \ldots, c'_n) \in R_{Q_{l-1}}^{n+1})$$

where $$c'_i = [q_l^{-1} \cdot c_i](\mathrm{mod}Q_{l-1}) \text{ for } 0 \le i \le n,$$

and provided with a public key $\{pk_i\}_{1 \le i \le n}$. The re-linearization procedure Relin $(\{pk_i\}_{1 \le i \le n}; \overline{ct}_{mul})$ for the output ciphertext may follow a process procedure in Table 1 below.

TABLE 1

Input: $\overline{ct}_{mul} = (c_{i,j})_{0 \le i,j \le n} \in R_{Q_l}^{(n+1) \times (n+1)}$, $\{pk_i = (b_i, d_i, u_i, v_i)\}_{1 \le i \le n}$ Output: $\overline{ct}^* = (c_i^*)_{0 \le i \le n} \in R_{Q_l}^{n+1}$ 1:     $c_0^* \leftarrow c_{0,0}$ 2:     for $1 \le i \le n$ do 3:     $c_i^* \leftarrow c_{0,i} + c_{i,0}(\mathrm{mod}~Q_l)$ 4:     end for
5:     for $1 \le j \le n$ do 6:     $c_j^* \leftarrow c_j^* + \sum_{1 \le i \le n} c_{i,j} \boxdot d_i(\mathrm{mod}~Q_l)$ 7:     end for
8:     for $1 \le i \le n$ do
9:     $x_i \leftarrow \Sigma_{1 \le j \le n} c_{i,j} \boxdot b_j$ (mod $Q_l$)

10:     $(c_0^*, c_i^*) \leftarrow (c_0^*, c_i^*) + x_i \boxdot (v_i, u_i)(\mathrm{mod}~Q_l)$ 11:     end for Referring to lines 5 to 9 of Table 1, the electronic device 101 (e.g., the processor 120 of FIG. 1) according to an embodiment executes 1 to n loops for j and also executes 1 to n loops for i, and therefore, as the re-linearization process according to Table 1, a re-linearization process having a complexity of $n^2$ in generating a ciphertext for each of the integers i and j may be progressed.

A re-linearization procedure that is improved over Table 1 above may be used in some embodiments. For example, the electronic device 101 (e.g., the processor 120 of FIG. 1) according to an embodiment may accelerate the multiplication of the multi-key CKKS using homomorphic gadget decomposition. The re-linearization process of the CDKS may be optimized over the comparative embodiments. For example, the iterative procedure in lines 5 to 9 (Equation 1 below) of Table 1 above may be simplified.

$$\sum_{1 \le i \le n} c_{i,j} \boxdot d_i = \sum_{1 \le i \le n} \langle h(c_{i,j}), d_i \rangle \text{ for } 1 \le j \le n, \quad \text{[Equation 2]}$$

$$\sum_{1 \le j \le n} c_{i,j} \boxdot b_j = \sum_{1 \le j \le n} \langle h(c_{i,j}), b_j \rangle \text{ for } 1 \le i \le n.$$

Referring to Equation 2, the re-linearization process may be configured by a sum of h(ci,j), where both i and j are indexed, and thus may have a complexity of $O(n^2)$. The electronic device 101 (e.g., the processor 120 in FIG. 1) according to an embodiment may, in order to reduce complexity, separate the terms in the sum so that each term includes only the i or j index. Here, a homomorphic gadget decomposition operation may be applied. Referring to Table 2 below, $h(c_{i,j})$ is replaced by $h(c_i) \odot h(c'_j)$ through $c_{i,j} = c_i \cdot c'_j$, which is the attributes of gadget decomposition having homomorphic attributes, the re-linearization process may be expressed as Equation 3 below.

$$\sum_{1 \le i \le n} \langle h(c_i) \odot h(c'_j), d_i \rangle =$$
$$\left\langle h(c'_j), \sum_{1 \le i \le n} h(c_i) \odot d_i \right\rangle = c'_j \boxdot \left( \sum_{1 \le i \le n} h(c_i) \odot d_i \right)$$
$$\sum_{1 \le j \le n} \langle h(c_i) \odot h(c'_j), b_j \rangle = \left\langle h(c_i), \sum_{1 \le j \le n} h(c'_j) \odot b_j \right\rangle = c_i \boxdot \left( \sum_{1 \le j \le n} h(c'_j) \odot b_j \right) \quad \text{[Equation 3]}$$

The electronic device 101 (e.g., the processor 120 of FIG. 1) according to an embodiment may perform encryption, including a multiplication procedure, based on Equation 3 above. The electronic device 101 (e.g., the processor 120 of FIG. 1) according to an embodiment may reduce complexity by pre-calculating $\Sigma_{1 \le i \le n} h(c_i) \odot d_i$ and $\Sigma_{1 \le j \le n} h(c'_j) \odot b_j$, which depend only on i or j corresponding to a predetermined integer from 1 to n, respectively.

The electronic device 101 (e.g., the processor 120 of FIG. 1) according to an embodiment may perform, based on Table 2, the procedure of multi-key CKKS from the homomorphic gadget decomposition.

TABLE 2

Input: $\overline{ct} = (c_i)_{0 \le i \le n}, \overline{ct}' = (c'_i)_{0 \le i \le n}, \{pk_i = (b_i, d_i, v_i)\}_{1 \le i \le n}$ Output: $\overline{ct}^* = (c_i^*)_{0 \le i \le n} \in R_{Q_l}^{n+1}$ 1:     $c_0^* \leftarrow c_0 \cdot c'_0(\mathrm{mod}~Q_l)$ TABLE 2-continued

| 2: | for $1 \leq i \leq n$ do |
|---|---|
| 3: | $c_i^* \leftarrow c_0 \cdot c_i' + c_i \cdot c_0'(\mathrm{mod}\ Q_l)$ |
| 4: | end for |
| 5: | $z \leftarrow \Sigma_{1 \leq i \leq n} h(c_i) \odot d_i\ (\mathrm{mod}\ Q_l)$ |
| 6: | $w \leftarrow \Sigma_{1 \leq j \leq n} h(c'_j) \odot b_j\ (\mathrm{mod}\ Q_l)$ |
| 7: | for $1 \leq j \leq n$ do |
| 8: | $c_j^* \leftarrow c_j^* \cdot c'_j \boxdot z(\mathrm{mod}\ Q_l)$ |
| 9: | end for |
| 10: | for $1 \leq i \leq n$ do |
| 11: | $(c_0^*, c_i^*) \leftarrow (c_0^*, c_i^*) + \left(c_i \boxdot w\right)\boxdot(v_i, u_i)(\mathrm{mod}\ Q_l)$ |
| 12: | end for |

Referring to Table 2, the electronic device 101 (e.g., processor 120 of FIG. 1) according to an embodiment may identify a process procedure for outputting a ciphertext $\overline{ct}^*$. The electronic device 101 (e.g., the processor 120 of FIG. 1) according to an embodiment may, rather than following the approach of the comparative example where the multiplication procedure is performed sequentially with the tensor product and the re-linearization, perform both operations simultaneously.

The electronic device 101 (e.g., the processor 120 of FIG. 1) according to an embodiment may take, as input ciphertext, $\overline{ct}=(c_i)_{0 \leq i \leq n}$ and $\overline{ct}'=(c'_i)_{0 \leq i \leq n}$, which may use n times of operations, instead of ci,j, as compared to Table 1. As a result, the complexity of the computation procedure may be simplified to O(n).

Referring to Table 2, the electronic device 101 (e.g., the processor 120 of FIG. 1) according to an embodiment may perform calculations from 1 to n only for each of i or j corresponding to a predetermined integer while executing 1 to n loops for i in lines 2, 7, and 10, so as to reduce the complexity of ciphertext generation to O(n).

The electronic device 101 (e.g., the processor 201) according to an embodiment may, in performing the operation of encrypting with the multi-key CKKS scheme, take $\overline{ct}$, $\overline{ct}'$ as input, and output a ciphertext $\overline{ct}^*$ using a public key $\{pk_i\}_{1 \leq i \leq n}$ corresponding to the number of parties n.

The electronic device 101 (e.g., the processor 201) that performs the ciphertext generation according to an embodiment may maintain security even if some pki of the public keys are provided to an attacker. The electronic device 101 (e.g., the processor 201) performing ciphertext generation according to an embodiment may derive that the following expression is satisfied $\langle \overline{ct}^*, (1,\overline{sk})\rangle \approx \mu\mu'(\mathrm{mod}\ Q_l)$, for example. Here, according to a gadget decomposition based on the attributes of the homomorphism for $\langle \overline{ct}^*, (1, \overline{sk})\rangle$, it may be identified that $\langle \overline{ct}^*, (1, \overline{sk})\rangle$ is derived to have a value similar to $\langle \overline{ct}, (1, \overline{sk})\rangle \cdot \langle \overline{ct}', (1, \overline{sk})\rangle\ (\mathrm{mod}\ Q_l)$.

The multiplication procedure performed by the electronic device 101 (e.g., the processor 201) performing ciphertext generation according to an embodiment may use 3n multiplications in the gadget decomposition including the NTT operation, and thus the complexity in generating the encryption may be O(n).

The electronic device 101 (e.g., the processor 201) performing ciphertext generation according to an embodiment may take two ciphertexts as input and compute a multi-key through a public key. The output ciphertext may be derived through re-linearization, as described above. The multi-key may be obtained through a tensor product and a scaling factor of the two ciphertexts. When two multi-keys according to the CDKS method are used in the same re-linearization procedure, the complexity of generating the ciphertext is the same as that of the CKKS multiplication procedure described above. In the case of multi-key BFV, the ciphertext (ci,j) for the re-linearization procedure may not be expressed as a product of two elements, and the homomorphic attributes may be unable to be applied to the ciphertext (ci,j). Accordingly, the multi-key BFV is not compatible with CKKS. Therefore, designing a multi-key BFV scheme from the homomorphic gadget decomposition described above may result in security and performance degradation. Therefore, the electronic device 101 (e.g., the processor 201) that performs ciphertext generation according to an embodiment may operate as shown in Table 3 for a multi-key BFV method.

TABLE 3

Input: $\overline{ct} = (c_i)_{0 \leq i \leq n}$, $\overline{ct}' = (c'_i)_{0 \leq i \leq n}$, $\{pk_i = (b_i, d_i, u_i, v_i)\}_{1 \leq i \leq n}$ Output: $\overline{ct}^* = (c_i^*)_{0 \leq i \leq n} \in R_Q^{n+1}$

| 1: | $c_0^* \leftarrow [(t/Q) \cdot (c_0 c'_0)](\mathrm{mod}\ Q)$ |
|---|---|
| 2: | for $1 \leq i \leq n$ do |
| 3: | $c_i^* \leftarrow [(t/Q) \cdot (c_0 c'_i + c_i c'_0)](\mathrm{mod}\ Q)$ |
| 4: | end for |
| 5: | $z \leftarrow \Sigma_{1 \leq i \leq n} \overline{h}(c_i) \odot d_i\ (\mathrm{mod}\ Q)$ |
| 6: | $w \leftarrow \Sigma_{1 \leq j \leq n} \overline{h}(c'_j) \odot b_j\ (\mathrm{mod}\ Q)$ |
| 7: | for $1 \leq j \leq n$ do |
| 8: | $c_j^* \leftarrow c_j^* \cdot c'_j \boxdot z(\mathrm{mod}\ Q)$ |
| 9: | end for |
| 10: | for $1 < i < n$ do |
| 11: | $(c_0^*, c_t^*) \leftarrow (c_0^*, c_i^*) + \left(c_i \boxdot w\right)\boxdot(v_i, u_i)(\mathrm{mod}\ Q)$ |
| 12: | end for |

Referring to Table 3, the electronic device 101 (e.g., the processor 201) performing ciphertext generation according to an embodiment may, when provided with two ciphertexts $\overline{ct}=(c_i)_{0 \leq i \leq n}$ and $$\overline{ct}' = (c'_i)_{0 \leq i \leq n} \in R_Q^{n+1},$$

derive a ciphertext $$\overline{ct}^* = (c_i^*)_{0 \leq i \leq n} \in R_Q^{n+1}$$

through an associated public key $\{pk_i\}_{1 \leq i \leq n}$. In an example, the multi-key BFV method may have a complexity of O(n) compared to the complexity of $O(n^2)$ of the re-linearization procedure by CDKS, similar to the multi-key CKKS.

For the problem that the multiplication process in the implementation of MKHE achieves good performance in the homomorphic attributes of gadget decomposition but increases the complexity, a scheme of multi-key BFV and multi-key CKKS can be applied to address the complexity.

Figure 4:
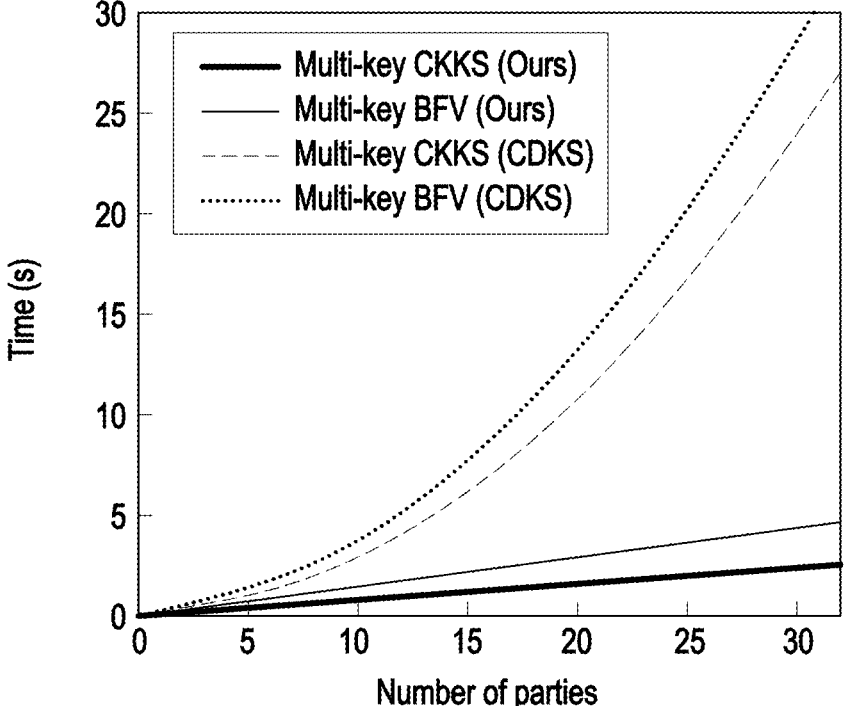
FIG. 4 is an exemplary diagram for comparing performance with a comparative example when an electronic device performs a method according to an embodiment.

FIG. 4 is an exemplary diagram for comparing performance with a comparative embodiment when the electronic device 101 (e.g., the processor 201) performs a method according to an embodiment.

Referring to FIG. 4, the execution time of the procedure is shown based on the number of parties n increasing to n=2, 4, . . . , 64 in MKHE. Referring to FIG. 4, it may be seen that the execution time increases exponentially for the CDKS encryption operation based on the number of parties n increasing, and the time taken for encryption operations according to the multi-key CKKS and multi-key BFV methods according to an embodiment increases linearly.

According to the multi-key CKKS and multi-key BFV in some embodiments, the complexity increases linearly in performing encryption, and thus as the number of participants increases, the encryption operation may be performed faster than in the comparative example.

An electronic device 101 for generating a homomorphic ciphertext according to an embodiment may include at least one processor 201, wherein the at least one processor identifies n messages.

An electronic device 101 for generating a homomorphic ciphertext according to an embodiment may encode each of the n messages to generate a first set and a second set each including n ciphertexts.

An electronic device 101 for generating a homomorphic ciphertext according to an embodiment may output a third set corresponding to a multi-key by applying a public key based on the first set and the second set.

An electronic device 101 for generating a homomorphic ciphertext according to an embodiment may control the generation of the first set and the second set and the output of the third set to operate in a complexity of O(n).

An embodiment may include an electronic device 101 (e.g., a processor 120) for generating a homomorphic ciphertext, in which the first set and the second set each including the n ciphertexts are decryptable with n secret keys, respectively, and the public key is configured by n public keys.

An embodiment may include an electronic device 101 (e.g., a processor 120) for generating a homomorphic ciphertext, in which the third set is an output value for the computation configured by a product of the ciphertext of the first set and the ciphertext of the second set.

An embodiment may include an electronic device 101 (e.g., a processor 120) for generating a homomorphic ciphertext, in which the computation of the ciphertext of the first set and the ciphertext of the second set follows the homomorphic attributes of gadget decomposition.

An embodiment may include an electronic device 101 (e.g., a processor 120) for generating a homomorphic ciphertext, in which the first set and the second set are used as input ciphertext of a multi-key BFV scheme of CDKS.

An embodiment may include an electronic device 101 (e.g., a processor 120) for generating a homomorphic ciphertext, in which the first set and the second set are used as input ciphertext of a multi-key CKKS scheme of the CDKS.

An embodiment may include an electronic device 101 (e.g., a processor 120) for generating a homomorphic ciphertext, in which the third set is calculated by a tensor product and a re-linearization procedure of the first set and the second set.

A method by an electronic device 101 (e.g., a processor 120) for generating a homomorphic ciphertext according to an embodiment may include receiving n messages.

A method by an electronic device 101 (e.g., a processor 120) for generating a homomorphic ciphertext according to an embodiment may include encoding each of the n messages to generate a first set and a second set each including n ciphertexts.

A method by an electronic device 101 (e.g., a processor 120) for generating a homomorphic ciphertext according to an embodiment may include outputting a third set corresponding to a multi-key by applying a public key based on the first set and the second set.

An embodiment may include a method by an electronic device 101 (e.g., a processor 120) for generating a homomorphic ciphertext, in which the generation of the first set and the second set and the output of the third set operate in a complexity of O(n).

An embodiment may include a method by an electronic device 101 (e.g., a processor 120) for generating a homomorphic ciphertext, in which the first set and the second set each including the n ciphertexts are decrypted with n secret keys, respectively.

An embodiment may include a method by an electronic device 101 (e.g., a processor 120) for generating a homomorphic ciphertext, in which the public key is configured by n public keys.

An embodiment may include a method by an electronic device 101 (e.g., a processor 120) for generating a homomorphic ciphertext, in which the third set is an output value of the computation configured by a product of the ciphertext of the first set and the ciphertext of the second set.

An embodiment may include a method by an electronic device 101 (e.g., a processor 120) for generating a homomorphic ciphertext, in which the computation of the ciphertext of the first set and the ciphertext of the second set follows the homomorphic attributes of gadget decomposition.

An embodiment may include a method by an electronic device 101 (e.g., a processor 120) for generating a homomorphic ciphertext, in which the first set and the second set are used as input ciphertext of a multi-key BFV scheme of CDKS.

An embodiment may include a method by an electronic device 101 (e.g., a processor 120) for generating a homomorphic ciphertext, in which the first set and the second set are used as input ciphertext of a multi-key CKKS scheme of CDKS.

An embodiment may include a method by an electronic device 101 (e.g., a processor 120) for generating a homomorphic ciphertext, in which the third set is calculated by a tensor product and re-linearization procedure of the first set and the second set.

What is claimed is:

1. An electronic device for generating a homomorphic ciphertext, comprising:
   at least one processor including processing circuitry, and
   memory comprising one or more storage media storing instructions that, when executed by the at least one processor individually or collectively, cause the electronic device to:
   identify one or more messages;
   encode each of the one or more messages to generate a first set and a second set each including one or more ciphertexts; and
   output a third set corresponding to a multi-key by applying a public key based on the first set and the second set,
   wherein generation of the first set and the second set and the output of the third set are controlled to operate with a complexity of O(n), and wherein n is equal to a number of the one or more messages or a number of the one or more ciphertexts.

2. The electronic device of claim 1, wherein the first set and the second set are each decryptable with one or more secret keys, respectively, wherein the public key is configured by one or more public keys, and wherein a number of the one or more secret keys and a number of the one or more public keys are equal to the number of the one or more messages.

3. The electronic device of claim 1, wherein the third set is an output value for a first computation configured by a product of a first ciphertext of the first set and a second ciphertext of the second set.

4. The electronic device of claim 1, wherein a first computation of a first ciphertext of the first set and a second computation of a second ciphertext of the second set follow homomorphic attributes of gadget decomposition.

5. The electronic device of claim 1, wherein the first set and the second set are input ciphertexts of a multi-key BFV scheme of CDKS.

6. The electronic device of claim 5, wherein the first set and the second set are input ciphertexts of a multi-key CKKS scheme of the CDKS.

7. The electronic device of claim 1, wherein the third set is calculated by a tensor product and re-linearization of the first set and the second set.

8. A method for generating a homomorphic ciphertext by an electronic device, comprising:

identifying one or more messages;

encoding each of the one or more messages to generate a first set and a second set each including one or more ciphertexts; and outputting a third set corresponding to a multi-key by applying a public key based on the first set and the second set, wherein generation of the first set and the second set and the outputting the third set operate in a complexity of O(n), and wherein n is equal to a number of the one or more messages and a number of the one or more ciphertexts.

9. The method of claim 8, wherein the first set and the second set are each decryptable with one or more secret keys, respectively, the public key is configured by one or more public keys, and wherein a number of the one or more secret keys and a number of the one or more public keys are equal to the number of the one or more messages.

10. The method of claim 8, wherein the third set is an output value of a first computation configured by a product of a first ciphertext of the first set and a second ciphertext of the second set.

11. The method of claim 8, wherein a first computation of a first ciphertext of the first set and a second computation of a second ciphertext of the second set follow homomorphic attributes of gadget decomposition.

12. The method of claim 8, wherein the first set and the second set are input ciphertexts of a multi-key BFV scheme of CDKS.

13. The method of claim 8, wherein the first set and the second set are input ciphertexts of a multi-key CKKS scheme of CDKS.

14. The method of claim 8, wherein the third set is calculated by a tensor product and re-linearization of the first set and the second set.

15. A non-transitory computer readable medium storing instructions that, when executed by at least one processor of an electronic device, cause the electronic device to:

identify one or more messages;

encode each of the one or more messages to generate a first set and a second set each including one or more ciphertexts; and output a third set corresponding to a multi-key by applying a public key based on the first set and the second set, wherein generation of the first set and the second set and the output of the third set are controlled to operate with a complexity of O(n), and wherein n is equal to a number of the one or more messages or a number of the one or more ciphertexts.

* * * * *